July 25, 1944.　　　J. G. FISHER　　　2,354,366
VALVE SHUTOFF DEVICE
Filed Feb. 12, 1944　　　2 Sheets-Sheet 1
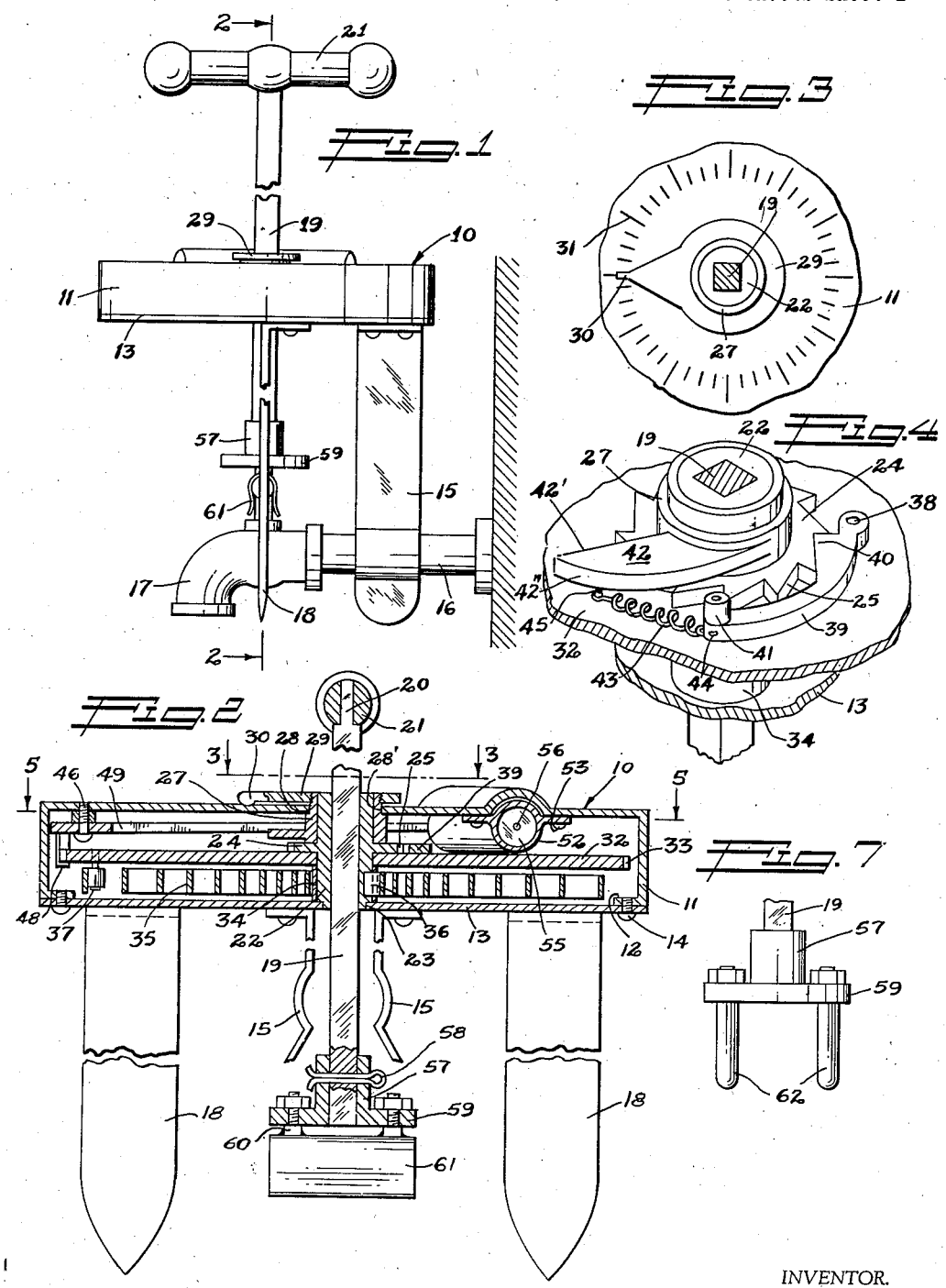
INVENTOR.
JOHN G. FISHER
BY
ATTORNEY July 25, 1944.  J. G. FISHER  2,354,366
VALVE SHUTOFF DEVICE
Filed Feb. 12, 1944  2 Sheets-Sheet 2
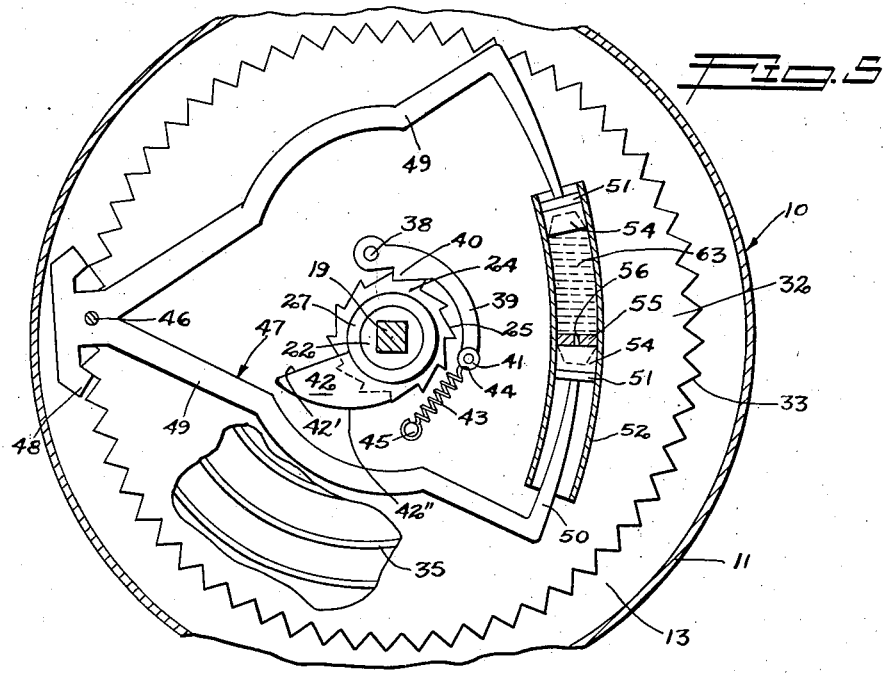
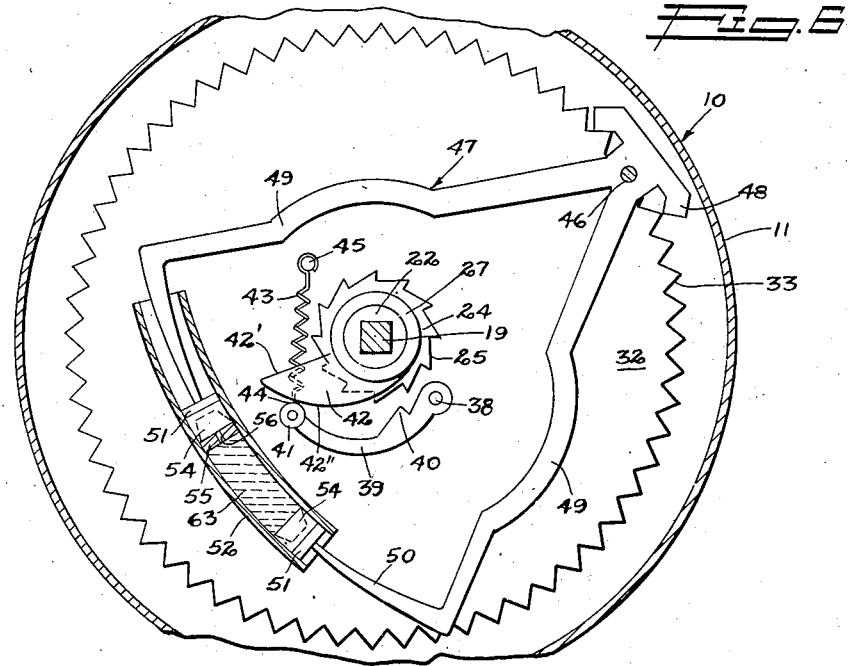
INVENTOR.
JOHN G. FISHER
BY
ATTORNEY Patented July 25, 1944

2,354,366

UNITED STATES PATENT OFFICE 2,354,366

VALVE SHUTOFF DEVICE

John G. Fisher, Monrovia, Calif.

Application February 12, 1944, Serial No. 522,169

7 Claims. (Cl. 161—7)

This invention relates to an automatic valve shut-off mechanism and more particularly to a manually operated automatic valve shut-off adapted to be used in connection with a water faucet or the like.

The general object of my invention is to provide a novel automatic shut-off adapted to be fastened directly to a faucet handle or lawn sprinkler shut-off handle.

Another object of this invention is to provide a novel automatic shut-off device which is rigid in construction and adapted to withstand much hard use and handling.

Another object of the invention is to provide a novel time controlled mechanism for an automatic shut-off device.

Other and further important objects of the invention will become apparent from the disclosures in the specification, appended claims and accompanying drawings, wherein:

Fig. 1 is a side elevation view of a device embodying features of my invention as used in connection with a water faucet;

Fig. 2 is a longitudinal sectional view as taken on line 2—2, Fig. 1;

Fig. 3 is a fragmentary sectional view taken on line 3—3, Fig. 2;

Fig. 4 is a fragmentary isometric view of the central operating mechanism of my invention;

Fig. 5 is a sectional view taken on line 5—5, Fig. 2;

Fig. 6 is a view similar to Fig. 5 with parts in different positions, and

Fig. 7 is a view of an alternate faucet attaching member.

Referring to the drawings by reference characters, I have shown my invention as embodied in a manually operated automatic valve shut-off device which is indicated generally at 10. As shown, the device includes a housing 11 having an in-turned flange 12 on which a bottom closure plate 13 is held in place by suitable fastening means such as screws 14.

Depending from and attached to the plate 13 I provide a pair of spaced supporting members 15 adapted to clamp about the feed pipe 16 of a faucet 17, also a pair of vertically disposed, pointed stake members 18, adapted to be forced into the earth adjacent a lawn, flush type, sprinkler shut-off valve handle.

Arranged within the central portion of the housing device I provide a square bar member 19 having its upper end reduced in size as at 20 to receive a handle 21.

The bar 19 is slidably supported in a square aperture in a vertically disposed bearing member 22 which has its lower end reduced in diameter as at 23 to be received in a central aperture in the bottom plate 13. The member 22 includes a flange 24 which has ratchet teeth 25 thereon.

Arranged with its lower edge against the flange 24 and rotatably supported on the bearing member 22 I provide a collar 27 having its upper end reduced in diameter as at 28 and received in an aperture 28' in the top of the case 11. The upper end of the collar is threaded and extends above the case 11 to threadedly engage a timesetting arm 29. A reduced end 30 of the arm 29 is adapted to be received in any one of several notches 31, in the top of the case 11, to prevent rotation of said arm.

Positioned about the member 22, adjacent to the lower side of the flange 24, I provide a timing gear 32 having teeth 33. The gear 32 is retained in position by a collar 34. A coiled spring 35 is arranged intermediate the gear 32 and the bottom plate 13 and has its inner end attached to the member 22 as at 36 while its outer end is fastened to the gear by means of a pin 37.

Pivotally supported as at 38, Fig. 4, to the gear 32 I provide an arm 39 having a dog 40 adjacent its pivoted end and adapted to engage the ratchet 25 while its outer end is provided with a roller 41, which, when rotated to the position shown in Fig. 6, will engage a cam member 42, having a radial straight surface 42' and a cam surface 42'', on the collar 27. The arm 38 with its dog 40 is held against the ratchet 25 by means of a spring 43 having one end attached to the arm as at 44 and having the other end supported by a pin 45 on the gear 32.

Pivotally supported at 46 on the top of the case 11 I provide an escapement member 47 which has downwardly extending dogs adapted to engage in the teeth 33 of the gear 32 and which includes a pair of arms 49 having inwardly turned ends 50. The ends 50 are adapted to engage circular piston like plate members 51 within an arcuate tube 52. The tube 52 is supported by flanges 53 on the top of the case 11.

A pair of rubber sealing piston members 54 are attached to the inner ends of the plates 51 as by vulcanizing. An annular partition 55 is arranged at the center of the tube 52 and has a central metering aperture 56. Tube 52 may be filled with a fluid such as oil 63.

The lower end of the arm 19 is shown as fitted with an adapter 57, held in place by a cotter pin 58 and having a flange 59 from which depend a pair of rods 60. These rods may be suitably attached to a handle engaging member 61 which may be in the shape of an inverted V to fit over the faucet handle.

As shown in Fig. 7, the rods 60 may be replaced by longer rods 62 to be adapted for use with different types of valves.

In operation, the arm 29 is moved clockwise until the straight surface 42' of the cam 42 strikes the roller 41. It is then moved counterclockwise so that the end 30 of the arm 29 engages one of the notches 31 thus setting the predetermined time of shut off.

The spring 35 causes a clockwise tension to be applied to the gear 32 and through the teeth 33 and the dogs 48 the escapement arms 49 are caused to move back and forth. The fluid 63 in the tube 52 flows from one side of the partition 55 through the aperture 56 to the other side. This action regulates the speed at which the arms 49 move.

The arm 39 and the ratchet 24 are attached to the gear 32 by the pin 38 and are thus rotated. The rotation of the before-mentioned elements from a set or on position as illustrated in Fig. 5 continues until the parts approach the position illustrated in Fig. 6. It will be seen that the roller 41 in Fig. 6 engages the surface 42" of the cam 42 thereby moving the arm 39 outwardly and removing the dog 40 from the ratchet 25. This allows the spring 35 to act through the bearing member 22 and bar 19 to turn off the faucet.

During the rotation of the gear 32, before the dog 40 is removed from contact with the ratchet 25, the arm 19 is also being rotated thus slowly turning off the faucet. This movement is slight, however, and not enough to turn off the faucet completely and thus causes no inconvenience.

From the foregoing description it will be apparent that I have invented a novel valve shut-off device which can be economically manufactured and which is highly efficient for its intended purpose.

Having thus described my invention, I claim:

1. A shut-off device including a housing, a bearing rotatably mounted on the housing, a bar supported by said bearing and rotatable therewith, valve engaging means on the bar, said bearing having an outwardly extending ratchet toothed flange thereon, a collar rotatable on said bearing, a time setting arm secured to said collar, a timing gear rotatable on said bearing, spring means urging the timing gear in one direction, a dog pivotally mounted on said timing gear, said dog having a tooth engageable with the ratchet teeth on said flange, means normally urging the teeth into engagement, said collar having a cam member thereon, said cam member having an arcuate cam face, said dog including a member disposed to engage said cam face, and means controlling rotation of said timing gear.

2. A shut-off device including a housing, a bearing rotatably mounted on the housing, a bar supported by said bearing and rotatable therewith, valve engaging means on the bar, said bearing having an outwardly extending ratchet toothed flange thereon, a collar rotatable on said bearing, a time setting arm secured to said collar, a timing gear rotatable on said bearing, spring means urging the timing gear in one direction, ratchet means controlling rotation of said timing gear, shiftable cam means controlling release of said ratchet means, and an escapement member controlling rotation of said timing gear, said escapement including spaced arms, said arms having opposed ends, a piston member on each end, an arcuate tube on said housing top and slidably receiving said piston members, and a partition in the tube, said partition having a metering aperture.

3. A shut-off device including a housing, a bearing rotatably mounted on the housing, a bar rotatable with said bearing, valve engaging means on the bar, said bearing having a ratchet toothed flange thereon, a collar rotatable on said bearing, means to rotate said collar, a timing gear rotatable on said bearing, spring means urging the timing gear in one direction, a dog pivotally mounted on said timing gear, said dog having a tooth engageable with the ratchet teeth on said flange, means normally urging the teeth into engagement, said collar having a cam member thereon, said cam member having a cam face, said dog including a member disposed to engage said cam face, an escapement member including spaced arms, said arms having opposed ends, a piston member on each end, a tube on said housing and slidably receiving said piston members, and a partition in the tube, said partition having a metering aperture.

4. A shut-off device including a housing, a bearing rotatably mounted on the housing, a bar supported by said bearing and rotatable therewith, valve engaging means on the bar, said bearing having an outwardly extending ratchet toothed flange thereon, a collar rotatable on said bearing, a time setting arm secured to said collar, a timing gear rotatable on said bearing, spring means urging the timing gear in one direction, a dog pivotally mounted on said timing gear, said dog having a tooth engageable with the ratchet teeth on said flange, means normally urging the teeth into engagement, said collar having a cam member thereon, said cam member having an arcuate cam face, said dog including a member disposed to engage said cam face, an escapement member including spaced arms, said arms having opposed ends, a piston member on each end, an arcuate tube on said housing top and slidably receiving said piston members, and a partition in the tube, said partition having a metering aperture.

5. A shut-off device including a housing having a top and a bottom, a rotatable bearing mounted on the housing, said bearing having an aperture therethrough, a bar supported by said bearing and rotatable therewith, valve engaging means on the bar, handle means on the bar, said bearing having an outwardly extending ratchet toothed flange thereon, a collar rotatable on said bearing, a time setting arm secured to said collar, a timing gear rotatable on said bearing, spring means urging the timing gear in one direction, a dog pivotally mounted on said timing gear, said dog having a tooth engageable with the ratchet teeth on said flange, means normally urging the teeth into engagement, said collar having a cam member thereon, said cam member having an arcuate cam face, said dog including a member disposed to engage said cam face, an escapement member including spaced arms, said arms having opposed ends, a piston member on each end, an arcuate tube on said housing top and slidably receiving said piston members, a partition in the tube, said partition having a metering aperture, and a filling of oil in said tube between said piston members.

6. A shut-off device including a cylindrical housing having a closed top and a bottom, housing supporting members on said bottom, a rotatable bearing mounted on the housing, said bearing having a rectangular aperture therethrough, a rectangular bar slidable in said aperture, valve handle engaging means on the lower end of said bar, handle means on the top of said bar, said bearing having an outwardly extending flange thereon, ratchet teeth on the periphery of said flange, a collar rotatable on said bearing, a time setting arm secured to said collar, means to hold said arm in adjusted position, a timing gear mounted on said bearing, a coil spring about said bearing and having one end secured to the bearing and the other secured to said gear, a dog pivotally mounted on said gear adjacent to said flange, said dog having a tooth engageable with the ratchet teeth on said flange, means normally urging the teeth into engagement, said collar having a cam member thereon, said cam member having an arcuate cam face, a roller on said dog, said roller being disposed to engage said cam face, an escapement member pivotally mounted on said housing top, said escapement member having dependent spaced teeth thereon engageable with the teeth on said timing gear, said escapement member including arms diverging from the escapement member pivotal mounting, said arms having arcuate opposed ends, a piston member on each end, an arcuate tube on said housing top and slidably receiving said piston members, a partition in the tube, said partition having a metering aperture, and a filling of oil in said tube between said piston members.

7. A shut-off device including a cylindrical housing having a closed top with a removable bottom closure thereon, pipe engaging supporting members on the closure, stake members on the closure, a rotatable bearing mounted on the housing, said bearing having a rectangular aperture therethrough, a rectangular bar slidable in said aperture, valve handle engaging means on the lower end of said bar, handle means on the top of said bar, said bearing having an outwardly extending flange thereon, ratchet teeth on the periphery of said flange, a collar rotatable on said bearing, a time setting arm secured to said collar, said arm being arranged upon the top of said casing, the top of said casing having spaced notches therein adapted to engage a portion of the arm, a timing gear mounted on said bearing, a coil spring about said bearing, the inner end of said spring being secured to the bearing, the outer end of said spring being secured to said gear, a dog pivotally mounted on said gear adjacent to said flange, said dog having a tooth engageable with the ratchet teeth on said flange, spring means normally urging the teeth into engagement, said collar having a cam member thereon, said cam member having a radial face and an arcuate cam face, a roller on said dog, said roller being disposed to engage said cam face, an escapement member pivotally mounted on said housing top, said escapement member having dependent spaced teeth thereon engageable with the teeth on said timing gear, said escapement member incluuding arms diverging from the escapement member pivotal mounting, said arms having arcuate opposed ends, a plate member on each end, an arcuate tube on said housing top and receiving said plate members, a flexible piston member on each plate member and slidably disposed within the tube, a partition in the tube, said partition having a metering aperture, and a filling of oil in said tube between said piston members.

JOHN G. FISHER.